UNITED STATES PATENT OFFICE.

JOHN C. PERKINS, OF JERSEY CITY, NEW JERSEY, ASSIGNOR OF ONE-HALF OF HIS RIGHT TO RICHARD MYCOETH, SR., OF SAME PLACE.

MIXED PHOSPHATIC MANURE.

SPECIFICATION forming part of Letters Patent No. 233,875, dated November 2, 1880.

Application filed May 5, 1880. (No specimens.)

*To all whom it may concern:*

Be it known that I, JOHN C. PERKINS, of Jersey City, in the county of Hudson and State of New Jersey, have invented certain new and useful Improvements in the Manufacture of Artificial Manure or Superphosphate of Lime Compost, of which the following is a full, clear, and exact description, sufficient to enable others skilled in the art to practice my invention, said invention being an improvement upon that described and claimed in British Letters Patent No. 1,505, granted to John William Perkins, A. D. 1853.

The object of my invention is to provide a highly-concentrated fertilizer, designed to supply the stimulation necessary in order to promote the rapid growth of vegetation upon lands which have become impoverished by over-cropping, and where, by repeated growing of one kind of production, the soil has become deficient in some one or more of the necessary elements to render the same rich and fruitful.

By the application of my improved artificial manure, soil which has become unfit for cultivation and which will not pay for the labor necessary to put in a crop may be brought up to such a state as to amply remunerate the cultivator, and by continued use of the improved manure it will finally arrive at such a condition as to admit its use for crops requiring the richest and best of soil in order to insure successful and remunerative working.

My improved artificial manure or superphosphate of lime-compost is of such a character that it may be manufactured at a very low price, and furnished to consumers in large or small quantities. Many productions of this nature are very offensive to handle and ship, and great objection is made to storing the same; but by my improved method of manufacture, when the manure is completely prepared for use, there is scarcely any odor perceived and the above objections are entirely overcome.

I adopt the well-known principle common to all inventions of this class of fixing the salts and odorous gases contained in fish and animal matter and in fecal matter, such as nightsoil, &c., by the use and admixture therewith of sulphuric and hydrochloric acid.

In the process of manufacture I prefer to use strong sulphuric acid, not less than 1.66 gravity. The sulphuric acid should be placed in a mixing-machine of any approved construction, and said machine should be lined with lead, in order to prevent the action of the acid upon the material of which it is constructed. At the end of the machine there should be an aperture stopped by a plug, which, when drawn, will cause the machine to discharge itself of its contents.

In my improved method water is added to the sulphuric acid, and a mixer located in the machine is set in motion by means of a pulley located thereon and connected with the motive power by a belt in the usual manner. Raw or distilled bones and animal-charcoal are then put into the mixer, and coprolite or mineral-apatite in fine powder is added. Having previously prepared and mixed, upon a suitable mixing-floor or in a suitable vessel, sugar-scum, night-soil, raw fish, or fish-refuse, hard-wood charcoal in fine powder, and castor-pomace or the refuse of the castor-oil bean after the expression of the oil, I add thereto hydrochloric acid. This compost is then placed in the mixer along with its previous contents, as before described, and is fed gradually to the machine. The heat resulting from the action of the acid upon the animal and mineral matter will cause the same to dry out completely, still retaining all the valuable elements necessary for stimulating the growth of vegetation.

By my peculiar mode of mixing and the use of the mixing-floor I am enabled to dispense with the usual complicated and expensive steam-boilers, furnaces, &c., and the serious accidents which frequently occur where heat is employed, from the boiling over of the mixture, are entirely obviated, and the cost of preparing my improved artificial manure greatly reduced.

In order to make, say, thirty-five hundred pounds of my improved artificial manure or superphosphate of lime-compost, I employ the following ingredients, but any slight variation from the proportions as given will not materially deteriorate the completed product: I take of chloride of sodium, three hundred pounds; sulphate of lime, four hundred pounds; fat marl, two hundred pounds; ashes from calcined leather-shavings and tobacco-ash, each one hundred pounds; nitrate of soda and sulphate of ammonia, each twenty-five pounds; sulphuric acid, six hundred pounds; water, thirty gallons; fish or fish-refuse, six hundred pounds; night-soil, six hundred pounds; castor-pomace, one hundred pounds; mineral apatite or coprolite, in fine powder, eight hundred pounds; raw or distilled bones, six hundred pounds; animal-charcoal, two hundred and twenty pounds; sugar-scum, four hundred pounds; and hard-wood charcoal, seventy-five pounds.

When the ingredients are compounded and mixed substantially in accordance with the foregoing description, the resultant product will be found to admirably answer the purposes for which it is intended.

This article may be put up and packed for shipment in bags, barrels, &c., and being in a fine dry powder it may be sown broadcast or applied with a seed-drill, and it will be found equal to Peruvian guano in its fertilizing properties, more lasting in the soil, and can be sold at a much less price per ton.

Having now fully described my invention, what I claim as new, and desire to secure by Letters Patent, is—

As a new article of manufacture, an artificial manure or superphosphate of lime compost, the same being composed of sulphuric acid, water, animal-charcoal, raw or distilled bones, marl, mineral apatite or coprolite, sugar-scum, night-soil, raw fish or fish-refuse, hard-wood charcoal, castor-pomace, hydrochloric acid, sulphate of lime, ashes from calcined leather-shavings, tobacco-ash, nitrate of soda, and sulphate of ammonia, the whole mixed in about the proportions hereinbefore specified, and for the uses and purposes set forth.

In testimony that I claim the foregoing I have hereunto set my hand in the presence of two witnesses.

JOHN C. PERKINS.

Witnesses:
S. W. HOLCOMB,
ARTHUR M. PIERCE.